(12) United States Patent
Koike

(10) Patent No.: US 10,533,535 B2
(45) Date of Patent: Jan. 14, 2020

(54) TURBINE BLADE

(71) Applicant: KORECARBON LLC, Lewes, DE (US)

(72) Inventor: Bento Massahiko Koike, Sorocaba (BR)

(73) Assignee: KORECARBON LLC, Lewes, DE (US)

(\*) Notice: Subject to any disclaimer, the term of this patent is extended or adjusted under 35 U.S.C. 154(b) by 461 days.

(21) Appl. No.: 15/126,001

(22) PCT Filed: Mar. 17, 2015

(86) PCT No.: PCT/US2015/021042
§ 371 (c)(1),
(2) Date: Sep. 14, 2016

(87) PCT Pub. No.: WO2015/142904
PCT Pub. Date: Sep. 24, 2015

(65) Prior Publication Data
US 2017/0074241 A1 Mar. 16, 2017

Related U.S. Application Data

(60) Provisional application No. 61/955,541, filed on Mar. 19, 2014.

(51) Int. Cl.
*F03D 1/06* (2006.01)

(52) U.S. Cl.
CPC ........ *F03D 1/0675* (2013.01); *F05B 2230/50* (2013.01); *F05B 2240/30* (2013.01); *F05B 2250/131* (2013.01); *F05B 2250/132* (2013.01); *F05B 2280/6003* (2013.01)

(58) Field of Classification Search
CPC ................ F03D 1/0675; F05B 2230/50; F05B 2240/30; F05B 2250/131; F05B 2250/132; F05B 2280/6003; Y02E 10/721
See application file for complete search history.

(56) References Cited

U.S. PATENT DOCUMENTS

| 7,090,911 | B2 * | 8/2006 | Lascelles | B32B 3/28 428/163 |
| 7,625,185 | B2 | 12/2009 | Wobben | |
| 8,226,866 | B2 * | 7/2012 | Arelt | B29C 70/525 264/136 |

(Continued)

FOREIGN PATENT DOCUMENTS

WO 2012161741 A2 11/2012

OTHER PUBLICATIONS

Office Action from corresponding Chinese Application No. 201580014647.2 dated Mar. 30, 2018.

(Continued)

*Primary Examiner* — Jason D Shanske
*Assistant Examiner* — Eric J Zamora Alvarez
(74) *Attorney, Agent, or Firm* — Lando & Anastasi, LLP

(57) ABSTRACT

A spar for use in a blade of a wind turbine comprises a plurality of rods having polygonal cross-sections bundled together into a bundle having a first plurality of rods disposed along a widthwise extent of the bundle and a second plurality of rods disposed along a heightwise extent of the bundle and means to secure rods within the plurality of rods to one another.

22 Claims, 12 Drawing Sheets

(56) References Cited

U.S. PATENT DOCUMENTS

| | | | |
|---|---|---|---|
| 8,382,440 B2 | 2/2013 | Baker et al. | |
| 8,529,717 B2 * | 9/2013 | Hedges | B29C 70/083 |
| | | | 156/83 |
| 8,540,491 B2 | 9/2013 | Gruhn et al. | |
| 8,545,744 B2 * | 10/2013 | Jones | B29C 63/0021 |
| | | | 264/263 |
| 9,925,680 B2 * | 3/2018 | Kendrick | B26D 1/157 |
| 2008/0206059 A1 * | 8/2008 | Hancock | F03D 1/0658 |
| | | | 416/213 R |
| 2010/0314028 A1 | 12/2010 | Hedges et al. | |
| 2011/0135485 A1 * | 6/2011 | Wang | F03D 1/0675 |
| | | | 416/226 |
| 2011/0243750 A1 * | 10/2011 | Gruhn | B29B 11/16 |
| | | | 416/226 |
| 2012/0027609 A1 * | 2/2012 | Ogde | B29C 70/86 |
| | | | 416/226 |
| 2012/0213642 A1 * | 8/2012 | Wang | F03D 1/0675 |
| | | | 416/232 |
| 2014/0360323 A1 * | 12/2014 | Kendrick | B26D 1/157 |
| | | | 83/14 |
| 2015/0023799 A1 * | 1/2015 | Wetzel | F03D 1/0675 |
| | | | 416/226 |

OTHER PUBLICATIONS

International Search Report and Written Opinion from corresponding International Application No. PCT/US2015/021042 dated Jun. 16, 2015.

* cited by examiner

TURBINE BLADE

CROSS-REFERENCE TO RELATED APPLICATIONS

This application is a U.S. National Stage Application under 35 U.S.C. § 371 of International Application No. PCT/US2015/021042, filed Mar. 17, 2015, titled TURBINE BLADE, which claims the benefit of U.S. Provisional Application No. 61/955,541, filed Mar. 19, 2014, titled TURBINE BLADE, the entire contents of which are incorporated herein by reference.

TECHNICAL FIELD

Aspects and embodiments disclosed herein relate generally to wind turbine blades and to methods of construction of same.

BACKGROUND

Due in part to the increasing cost of fossil fuels, such as oil, and to a trend toward the utilization of more environmentally friendly "green" energy production methods, there has been an increase in the amount of energy generation systems utilizing wind turbines in recent years. This trend shows little sign of reversing. Thus, a need exists to provide reliable components for wind turbine systems.

Components of wind turbine systems that present significant engineering design challenges are the turbine blades. A wind turbine generally becomes more efficient as the length of the turbine blades increase. An area over which a wind turbine may capture energy from moving air increases with the square of the length of the turbine blades of the wind turbine. For example, a wind turbine having turbine blades 10 meters in length may capture energy from wind passing through a cross-sectional area four times that of a similar wind turbine with turbine blades five meters in length. Thus, there is a trend toward the production of wind turbines with turbine blades having significant lengths, for example, up to about 50 meters or more.

It is desirable that wind turbine blades have sufficient mechanical strength and stiffness to support their own weight without significant deformation and to resist deformation due to the force of wind on the blades during operation. Wind turbine blades also desirably have sufficient flexibility to elastically deform rather than break upon the application of a sudden force, for example, from a gust of wind. The flexibility of wind turbine blades should be limited, however, so that the blades do not flex to a degree such they impact a tower of the wind turbine. It is further desirable that wind turbine blades be formed of low weight materials and structures so that a wind turbine may include turbine blades having low mass that can more efficiently capture energy from wind, for example, under conditions of low wind speed. The desire for a wind turbine blade to exhibit mechanical strength, stiffness, and low weight presents engineering challenges in the design of wind turbine blades, especially in wind turbine blades having significant lengths.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

SUMMARY

Figure 1:
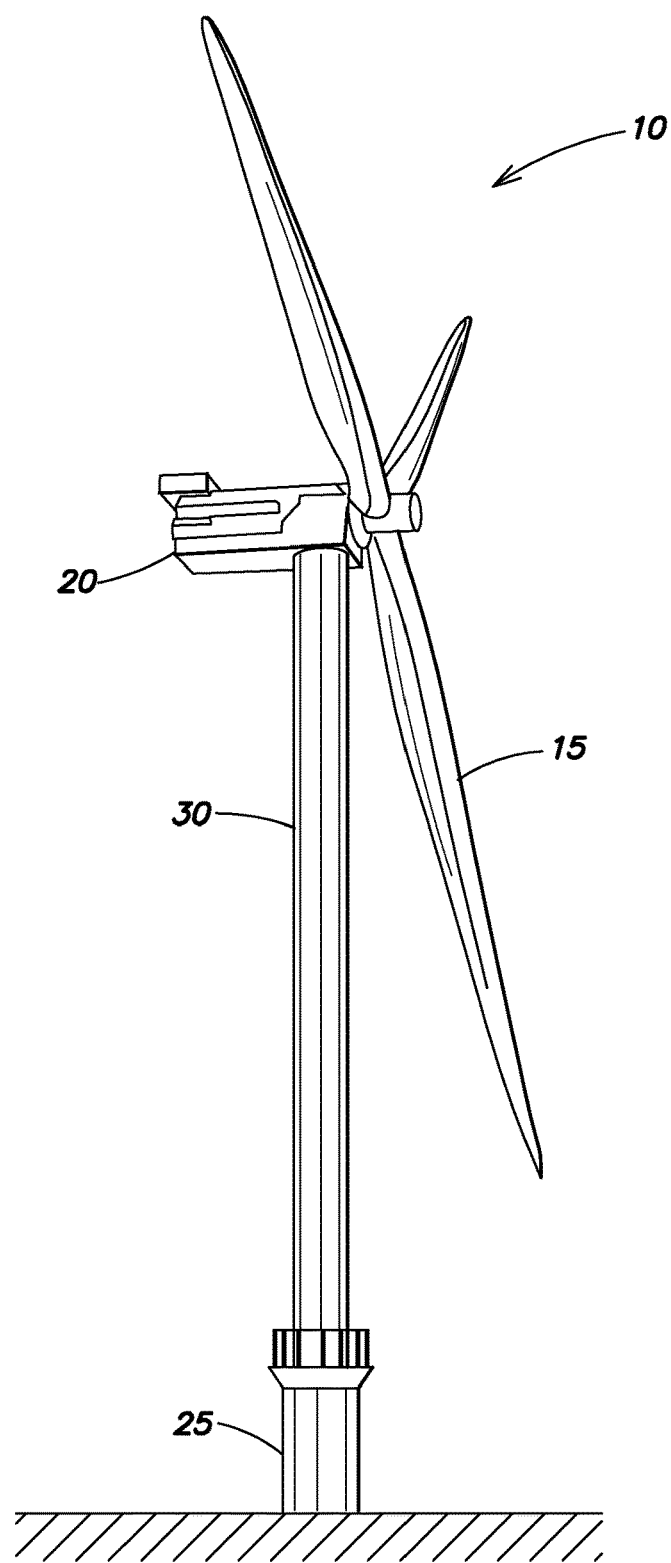
FIG. 1 illustrates an embodiment of a wind turbine.

In accordance with an aspect of the present disclosure, there is provided a spar for use in a blade of a wind turbine. The spar comprises a plurality of rods having polygonal cross-sections bundled together into a bundle having a first plurality of rods disposed along a widthwise extent of the bundle and a second plurality of rods disposed along a heightwise extent of the bundle and means to secure rods within the plurality of rods to one another.

In some embodiments, the plurality of rods is embedded in a matrix material. The matrix material may be a polymeric matrix material.

In some embodiments, the plurality of rods includes a rod with a hexagonal or substantially hexagonal cross-section. One of the majority of plurality of rods in the bundle of rods and all of the rods in the bundle of rods may have hexagonal or substantially hexagonal cross-sections.

In some embodiments, the plurality of rods includes rods formed of a pultruded composite including carbon fibers.

In some embodiments, the bundle of rods includes rods having different lengths. At least a portion of the plurality of rods may include tapered end portions. The tapered end portions may be located on ends of the portion of the plurality of rods distal from a portion of the bundle configured to be mounted proximate a base of the blade of the wind turbine and proximal to a portion of the bundle configured to be mounted proximate a tip of the blade of the wind turbine.

In some embodiments, the bundle of rods twists and curves along a lengthwise extent of the bundle into a shape configured to conform to an internal surface of the blade of the wind turbine. The bundle of rods may twist and curve along a lengthwise extent of the bundle into a shape configured to conform to an internal surface of an outer shell of the blade of the wind turbine.

In some embodiments, spacings are formed between adjacent rods in the bundle. At least a portion of the plurality of rods may include side surfaces having protrusions formed on the side surfaces. At least a portion of the plurality of rods include side surfaces may have channels formed in the side surfaces. One of a matrix material, a binding material, and an encapsulent may be disposed within at least a portion of the spacings.

In accordance with another embodiment, there is provided a wind turbine having a blade comprising a blade shell having an inner surface and a spar secured to the inner surface of the blade shell. The spar includes a plurality of rods having substantially hexagonal cross-sections bonded together.

In some embodiments, the plurality of rods comprise a pultruded composite including carbon fibers embedded in a matrix material and extending substantially parallel to a lengthwise extent of the spar.

In some embodiments, at least a portion of the plurality of rods include tapered end portions proximate a tip of the wind turbine blade.

In some embodiments, at least a portion of the plurality of rods are spaced from one another by one of protrusions and grooves formed in side surfaces of the at least a portion of the plurality of rods.

In some embodiments, the spar has a shape that changes along a spanwise direction of the wind turbine blade. The spar may conform to an internal surface of the turbine blade.

In accordance with another aspect, there is provided a method of forming a wind turbine blade. The method comprises bundling a plurality of rods to form a bundle of rods. The bundle includes a first plurality of rods disposed along a widthwise extent of the bundle and a second plurality of rods disposed along a heightwise extent of the bundle. The method further comprises shaping the bundle of rods into a shape configured to conform to an internal surface of a shell of the wind turbine blade, mounting the bundle of rods to an internal surface of the shell of the wind turbine blade, and encapsulating or bonding the bundle of rods.

DETAILED DESCRIPTION

The systems and methods described herein are not limited in their application to the details of construction and the arrangement of components set forth in the description or illustrated in the drawings. Aspects and embodiments disclosed herein are capable of being practiced or of being carried out in various ways. The phraseology and terminology used herein is for the purpose of description and should not be regarded as limiting. The use of "including," "comprising," "having," "containing," "involving," and variations thereof herein, is meant to encompass the items listed thereafter, equivalents thereof, and additional items.

Tower mounted horizontal-axis wind turbines (hereinafter "wind turbines") typically include a plurality of turbine blades, for example, three or four turbine blades mounted on a rotor. One example of a wind turbine 10 is illustrated in FIG. 1. Wind impacting the turbine blades 15 causes the turbine blades 15, and by extension, the rotor, to rotate. The rotor is typically mechanically coupled to an electrical generator through various gear boxes and other mechanical linkages in a nacelle 20 or in the base 25 of the wind turbine 10. The nacelle 20 may be supported by a tower 30. The wind turbine 10 converts kinetic energy from the wind to mechanical energy with the turbine blades. The mechanical energy is converted into electrical energy by the electrical generator.

Turbine blades for a wind turbine may include an outer shell formed in the shape of an airfoil. Strengthening elements may be provided internal to the outer shell or integral with the outer shell. For example, in some embodiments, a turbine blade may include an outer shell formed of, for example, metal sheeting or a composite, such as fiberglass or a carbon fiber reinforced composite, with an internal load-bearing beam structure disposed within and mechanically coupled to the outer shell. The internal load-bearing beam structure provides mechanical strength to the turbine blade. In other embodiments, a turbine blade may include an outer shell and one or more spars disposed within or formed integral with the outer shell. The spars may, in some embodiments, be formed from multiple sheets of fiberglass or carbon fiber laminated together with an epoxy or other polymeric material.

A challenge presented by wind turbine blade designs including internal beam structures or laminated spars is to provide the wind turbine blade with a desired degree of mechanical strength and stiffness along its entire length. Various prior art designs are incapable of providing a desired mechanical strength and degree of stiffness to a turbine blade while keeping the weight of the turbine blade below a desired weight. For example, it may be difficult to design a turbine blade including an internal beam structure that provides a desired degree of mechanical strength and stiffness to the end portion and tip of the turbine blade that may have a narrow cross-section relative to the base of the turbine blade.

Aspects and embodiments of turbine blades in accordance with the present disclosure address these deficiencies of prior art designs. For example, in various embodiments, turbine blades in accordance with the present disclosure include spar structures that may conform to the shape of the turbine blade along the entire length of the turbine blade while providing for better longitudinal mechanical properties than achievable in prior art designs. Further, in various embodiments, turbine blades in accordance with the present disclosure include spar structures that are mechanically simpler, easier to manufacture, and less costly to manufacture than many prior art designs.

Figure 2:
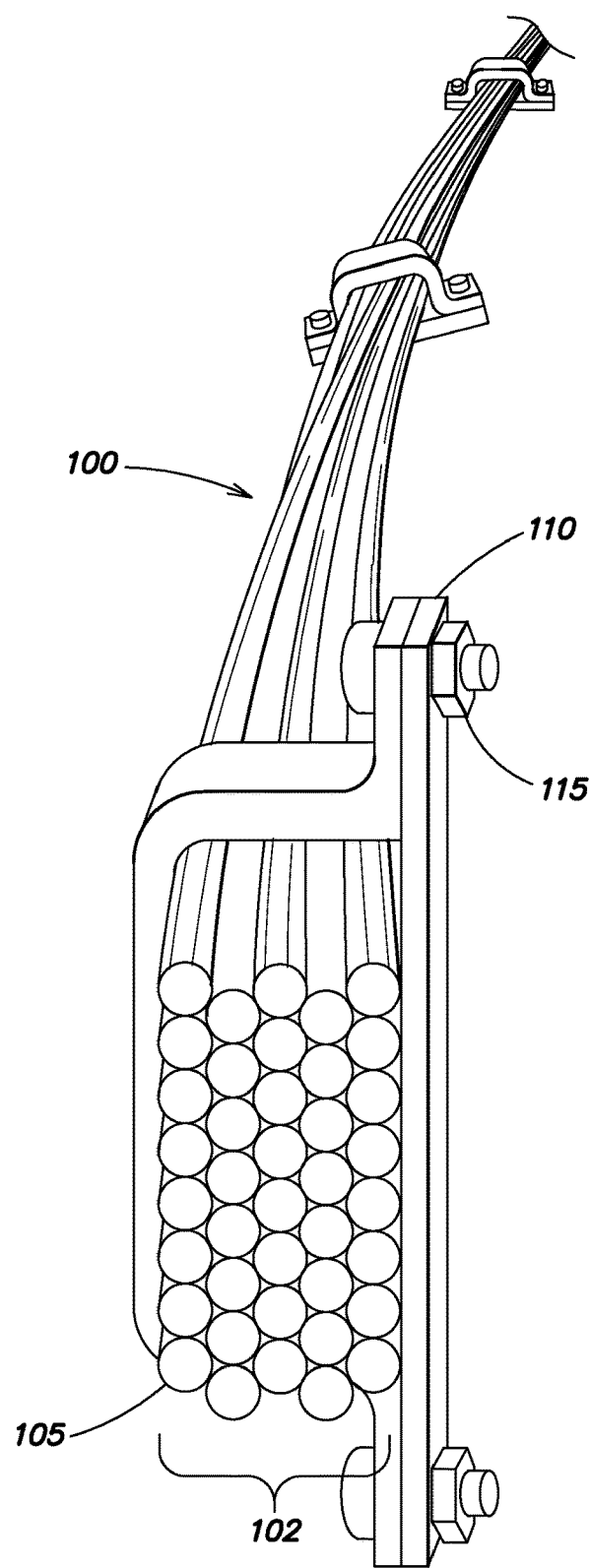
FIG. 2 illustrates an embodiment of a bundle of rods used to form a spar for a wind turbine blade.

In one embodiment, illustrated in FIG. 2, a spar 100 for a wind turbine blade includes a bundle 102 of a plurality of rods, each indicated at 105. The bundle of rods 102 includes multiple rows of rods 105 joined together, for example, adhesively bonded together. The bundle of rods 102 includes a plurality of rods 105 disposed along a widthwise extent of the bundle of rods 102 and a plurality of rods 105 disposed along a heightwise extent of the bundle of rods 102. The rods 105 in the bundle of rods 102 are, in some embodiments, adhered to one another and/or encapsulated prior to or concurrently with being adhered to or otherwise attached to a portion of a wind turbine blade to form a spar for the wind turbine blade.

Each rod 105 is formed from a composite material including, for example, fiberglass, carbon fibers, boron fibers, metallic fibers, and/or other fibers in a matrix of a suitable thermoset and/or thermoplastic resin matrix, for example, an epoxy matrix. The fibers of each rod 105 are oriented generally parallel to a lengthwise direction of the rod 105. Each rod 105 may be formed by, for example, extrusion, pultrusion, infusion, pre-preg, press molding, or other methods known in the art for the production of composite material structures. In some embodiments, the bundle of rods 102 includes rods 105 including carbon fibers embedded in a polymeric matrix formed by a pultrusion process. A pultrusion process provides for the carbon fibers in the rods 105 to be better aligned along a lengthwise extent of the rods 105 than other manufacturing techniques.

In some embodiments, the rods 105 in the bundle of rods 102 have a circular or substantially circular cross-section. The rods 105 in the bundle of rods 102 may be arranged to minimize the amount of empty space between the rods 102 or to have less empty space between the rods 105 in the bundle of rods 102 than would be present if the rods 105 were randomly arranged relative to one another. The bundle of rods 102 may be retained in one or more brackets 110 which may include one or more portions mechanically coupled by one or more fasteners 115, for example, nuts and bolts, pins, screws, or other fasteners known in the art. Each bracket 110 may hold the bundle of rods 102 in a desired configuration for attachment to an internal portion of a wind turbine blade.

The one or more brackets 110 may be utilized to hold the bundle of rods 102 together while shaping the bundle of rods 102 into a configuration having a desired amount of twist and/or curvature. The one or more brackets 110 may be removed prior to adhering the rods 105 in the bundle of rods 102 to one another, encapsulating the bundle of rods 102, and/or attaching the bundle of rods to a wind turbine blade to form a spar for the wind turbine blade. In other embodiments, no brackets 110 are utilized in forming the spar from the bundle of rods 102.

Figure 3:
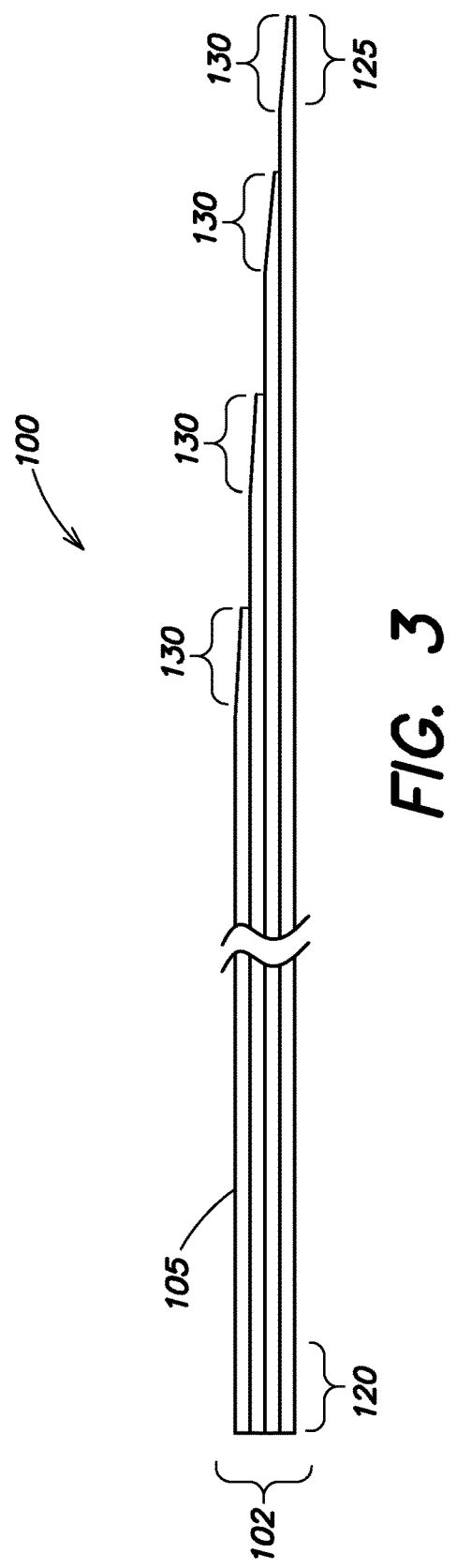
FIG. 3 is a schematic elevational view of an embodiment of a bundle of rods used to form a spar for a wind turbine blade.

The bundle of rods 102 twists along a length of the spar 100 as illustrated in FIG. 2. The bundle of rods 102 is configured with a twist which conforms with a twist of an internal surface of a wind turbine blade along a span of the wind turbine blade to which the bundle of rods 105 is to be attached. In some embodiments, for example, as illustrated schematically in FIG. 3, the bundle of rods 102 includes rods 105 of various lengths so that the bundle of rods 102 includes, for example, a greater number of rods at a position 120 along the length of the bundle of rods that is to be mechanically coupled proximate a base of a wind turbine blade, and, for example, a lesser number of rods at a position 125 along the length of the bundle of rods that is to be mechanically coupled proximate a tip of the wind turbine blade. The bundle of rods 102 may thus have a cross-sectional area that changes, for example, decreases, from a portion 120 configured to be coupled proximate to or at a base of a wind turbine blade (near the rotor) to a portion 125 configured to be coupled proximate to or at a tip of the wind turbine blade. As illustrated, in some embodiments, rods 105 within the bundle 102 include tapered end portions 130 rather than terminating at a cut face normal to the linear extent of the rods 105. The provision of tapered end portions 130 of the rods 105 provides for the mechanical properties of the spar to vary more smoothly along its length than if the rods 105 abruptly terminated. The bundle of rods 102 illustrated in FIG. 3 are shown without any twist or curvature for clarity, however, in actual implementations, the bundle of rods 102 would include a twist and curvature to match that of an internal surface of a turbine blade into which it is to be installed.

The bundle of rods 102 may have a width, a height, or both, that changes, for example, decreases from a portion configured to be coupled proximate to a thicker portion of a wind turbine blade (for example, proximate the base of the blade near the rotor) to a portion configured to be coupled proximate to or at a thinner portion of the wind turbine blade, from example, proximate to or at a tip of the wind turbine blade. The bundle of rods 102 may be sized and shaped to extend substantially or completely along a span of a wind turbine blade.

Figure 4A:
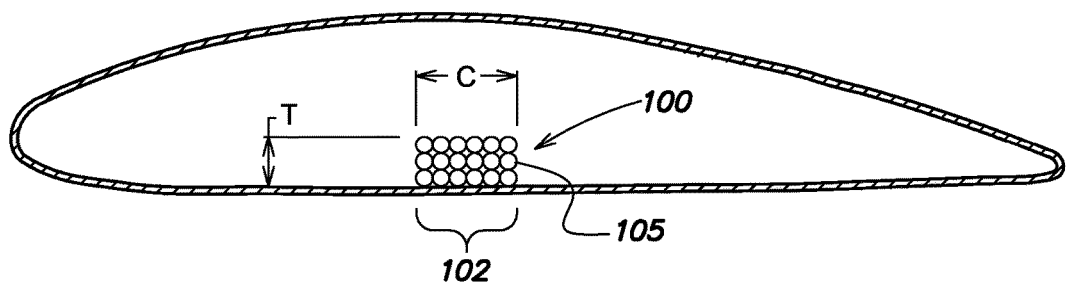
FIG. 4A is a schematic cross-sectional view of an airfoil of a wind turbine blade.
Figure 4B:
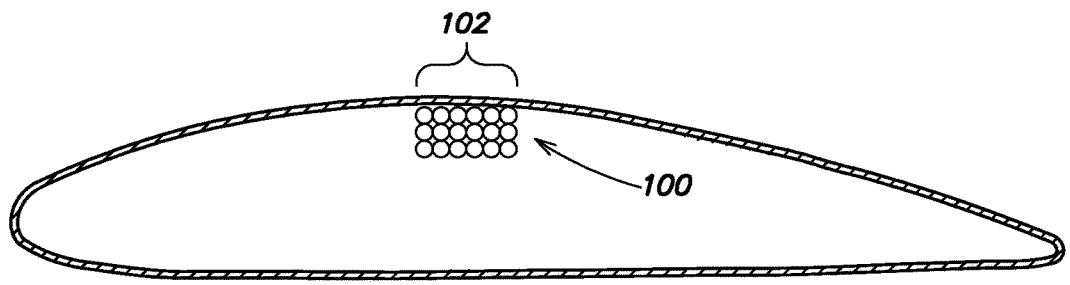
FIG. 4B is a schematic cross-sectional view of another airfoil of another wind turbine blade.
Figure 4C:
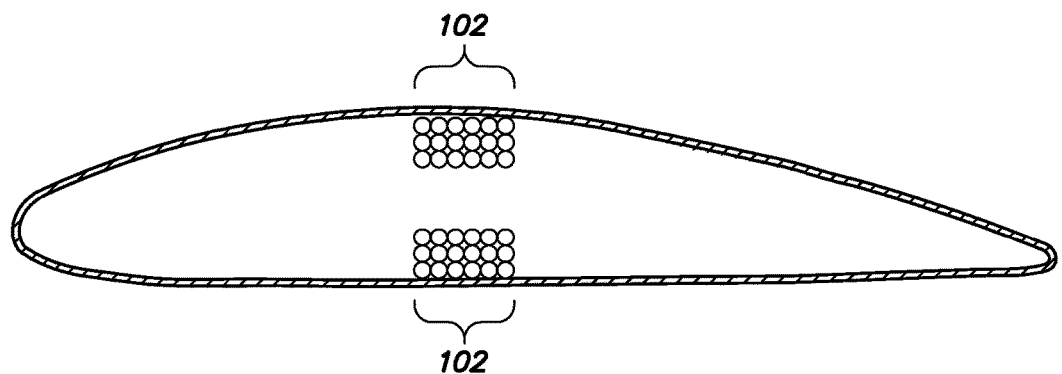
FIG. 4C is a schematic cross-sectional view of another airfoil of a wind turbine blade.

The configuration of the bundle of rods 102 may be designed to impart desired mechanical properties to the bundle of rods 102. As illustrated in schematic cross-section in FIG. 4A, a spar 100 formed from the bundle of rods 102 includes a number of rods 105 along a chordwise direction C and a number of rods 105 in a thickness direction T in one or more sections of the bundle of rods 102. The bundle of rods 102 is bonded to or formed integral with a shell of an airfoil of a wind turbine blade. The bundle of rods 102 may be bonded to or formed integral with a lower side of the airfoil, as illustrated in FIG. 4A, with an upper side of the airfoil, as illustrated in FIG. 4B, or the airfoil may include a first bundle of rods 102 bonded to or formed integral with a lower side of the airfoil and a second bundle of rods 102 bonded to or formed integral with an upper side of the airfoil, as illustrated in FIG. 4C.

Figure 4D:
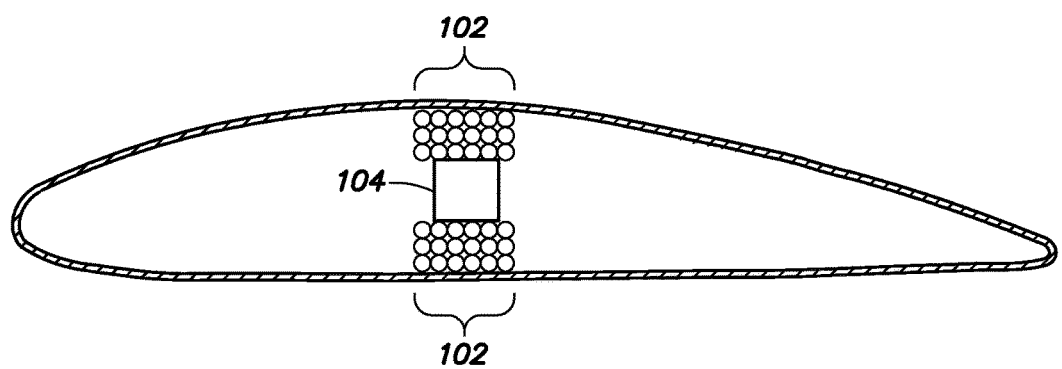
FIG. 4D is a schematic cross-sectional view of another airfoil of another wind turbine blade.

In other embodiments, two or more bundles of rods 102 are joined together by a beam web 104 to form a spar 100 having a cross-sectional shape of an I-beam (FIG. 4D) or a C-shaped structure. In one embodiment, the beam web 104 is formed from, for example, a foam core surrounded by a fiberglass or other composite material layer. The I-beam shaped spar 100 may be coupled, bonded to, or formed integral with one or both an upper internal wall of the airfoil of the wind turbine blade and a lower internal wall of the airfoil of the wind turbine blade.

The spars in each of FIGS. 4A-4D are illustrated at a single point along the length of an airfoil of a wind turbine blade. It should be appreciated that the bundles of rods 102 forming the spars in each of FIGS. 4A-4D may twist and/or curve along the length of the wind turbine blade so that a single face of the bundle of rods 102 may maintain contact with the upper or lower wall of the airfoil of the wind turbine blade along the length of the wind turbine blade. The dimensions of the one or more bundles of rods 102 may change along the length of the wind turbine blade, for example, reducing in height and/or width as the bundles of rods 102 approach the thin tip region of a wind turbine blade. The dimensions of the one or more bundles of rods 102 may change by altering a number of rods 105 in the bundles of rods 102 along the length of the wind turbine blade. The bundles of rods 102 may thus simultaneously twist, curve, and change in one or both of a widthwise and heightwise dimension to follow the complex geometry of an internal surface of a wind turbine blade along the length of the wind turbine blade.

Figure 5:
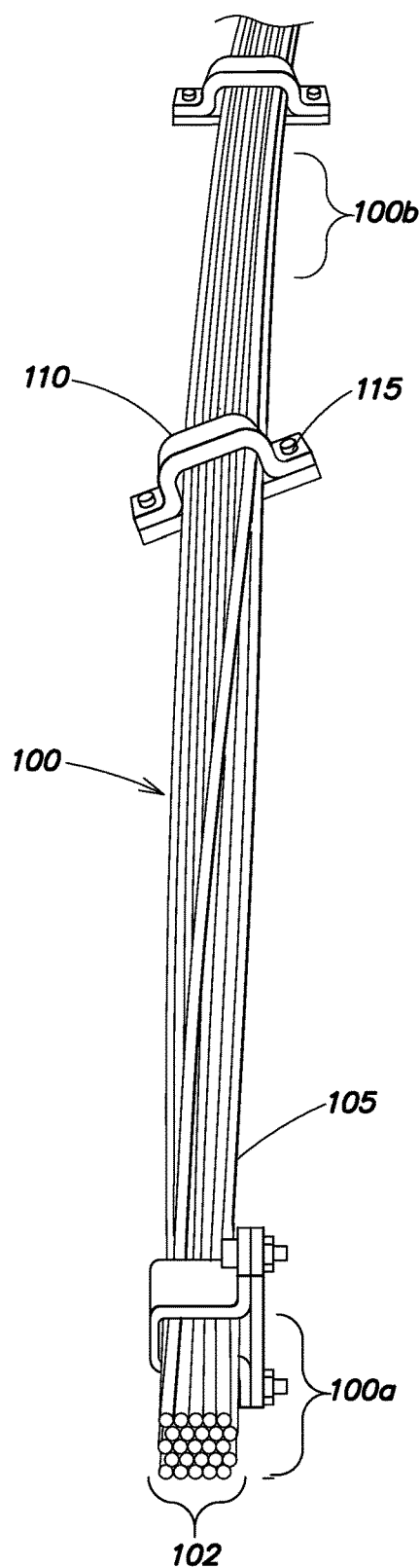
FIG. 5 illustrates another embodiment of a bundle of rods used to form a spar for a wind turbine blade.

FIG. 5 illustrates a bundle of rods 102 forming a spar 100 of a wind turbine blade and how the bundle of rods 102 may be shaped to twist and curve along a length of the bundle of rods 102. For example, as illustrated in FIG. 5, the bundle of rods 102 making up the spar 100 curves along the lengthwise direction of the bundle of rods 102 such that the widthwise extent of the rods 105 in the bundle of rods 102 in the section of the spar 100 indicated at 100a is non-parallel to the widthwise extent of the rods 105 in the bundle of rods 102 in the section of the spar 100 indicated at 100b. The bundle of rods 102 may be configured to both twist and curve along a spanwise length of the wind turbine blade (a direction along a line between the base or root of the turbine blade and the tip of the turbine blade) to conform to the shape of an internal surface of the wind turbine blade. The twist and curve of the bundle of rods 102 may provide for a single face of the bundle of rods 102 to maintain contact with or be disposed in a wall of the shell of the turbine blade along an entire, or substantially entire, length of the wind turbine blade.

Figure 6:
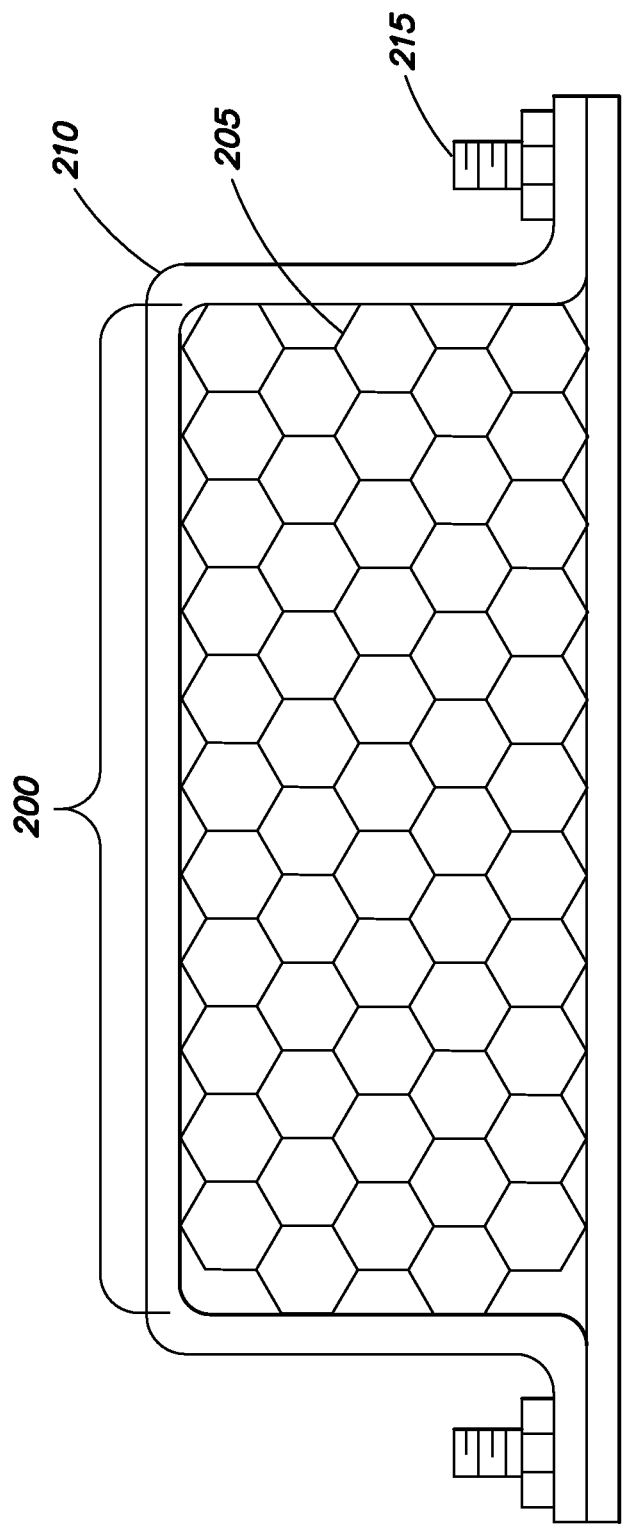
FIG. 6 illustrates another embodiment of a bundle of rods used to form a spar for a wind turbine blade.

In another embodiment, illustrated in FIG. 6, a spar 200 may be formed from a plurality of rods 205 having hexagonal or substantially hexagonal cross-sections. The rods 205 illustrated in FIG. 6 may be formed of similar materials as the rods 105 illustrated in FIG. 2 and FIG. 5. The hexagonal cross-section of the rods 205 illustrated in FIG. 6 allows the rods 205 to be arranged with less empty space between the rods 205 than if the rods were formed with a circular cross-section, for example, like the rods 105 illustrated in FIG. 2. A higher packing density of the rods in a spar for a wind turbine blade may be advantageous because a greater number of rods, and a greater number of strengthening fibers embedded in the rods, may fit in a smaller space, making the spar more compact and lighter as compared to a spar having rods with a lower packing density.

Forming a spar 200 from a plurality of rods 205 having hexagonal cross-sections may provide advantages over forming a spar from rods having other cross-sectional shapes, for example, square or circular cross-sectional shapes. In a bundle of rods having square or circular cross-sectional shapes, as the bundle of rods is curved and/or twisted to conform to the shape of a shell for a wind turbine blade, rods in the bundle of rods may shift or slide both longitudinally and along a widthwise and/or heightwise direction relative to one another. The widthwise and/or heightwise shifting of the rods relative to one another may cause gaps or voids to be formed in the bundle of rods as the bundle of rods is curved or twisted. The gaps or voids may be filled with adhesive during bonding of the individual rods in the bundle of rods to one another. The cross-section of the formed spar may thus include adhesive filled gaps or voids, making the spar heavier and having less rods and strengthening fibers per unit of cross-sectional area than desired. Further, in embodiments having rods terminating in tapered portions 130 as illustrated in FIG. 3 a hexagonal profile of the rods 105 may facilitate keeping the tapered end portions 130 in a desired orientation relative to the widthwise or heightwise extent of the bundle of rods 102 by reducing or eliminating the tendency of the rods 105 in the bundle 102 to twist relative to one another.

A bundle of rods formed of rods having hexagonal cross-sections is more resistant to the formation of gaps or voids in the bundle of rods upon twisting or curving than a bundle of rods having square or circular cross-sections. Due to the hexagonal geometry, it is more difficult for a layer of hexagonal rods to slide in a widthwise and/or heightwise direction (a direction normal to the lengthwise extent of the rods) over another layer of hexagonal rods or between an upper and a lower layer of hexagonal rods than it would be for a layer of rods having square or circular cross-sections to do so. A spar formed from a twisted and curved bundle of hexagonal rods may thus include fewer voids or gaps between rods than a spar formed from a twisted and curved bundle of rods with circular or square cross-sections. The spar formed from the twisted and curved bundle of hexagonal rods may thus be lighter (due to less adhesive included in voids or gaps) and have a higher density or rods and strengthening fibers per unit of cross-sectional area than a spar formed from a twisted and curved bundle of rods with circular or square cross-sections.

In some embodiments, it may be desirable to provide at least a small gap between adjacent rods 205 to allow for epoxy or other binding material or encapsulant to flow between the adjacent rods 205 to adhere them together.

Figure 7:
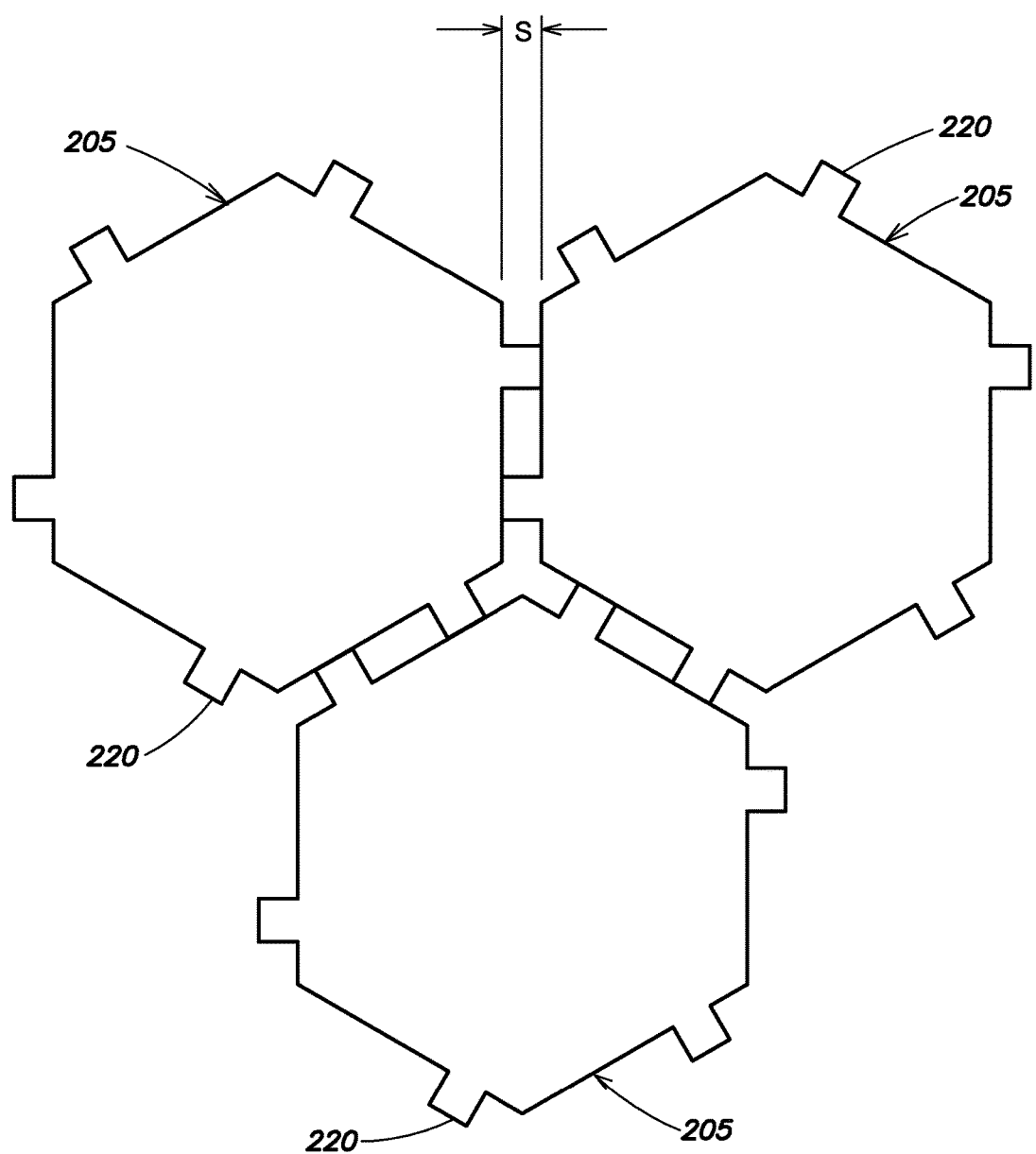
FIG. 7 is a schematic end view of a portion of a group of rods in an embodiment of a spar for a wind turbine blade.

Thus, in some embodiments the rods 205 include one or more features that introduce a gap or spacing between at least portions of adjacent rods 205. For example, in the embodiment illustrated in FIG. 7, one or more flat sides of the rods 205 include one or more protrusions 220 which provide for a small spacing S to be maintained between adjacent rods 205. The protrusions 220 may extend substantially or completely along a lengthwise extent of the rods 205. In some embodiments, the protrusions 220 are included in only a subset of rods 205 in a bundle of rods. In other embodiments, the protrusions 220 may be replaced by or supplemented by one or more grooves or channels, valleys, or other features which may provide for adhesive material to flow between adjacent rods 205.

Figure 8:
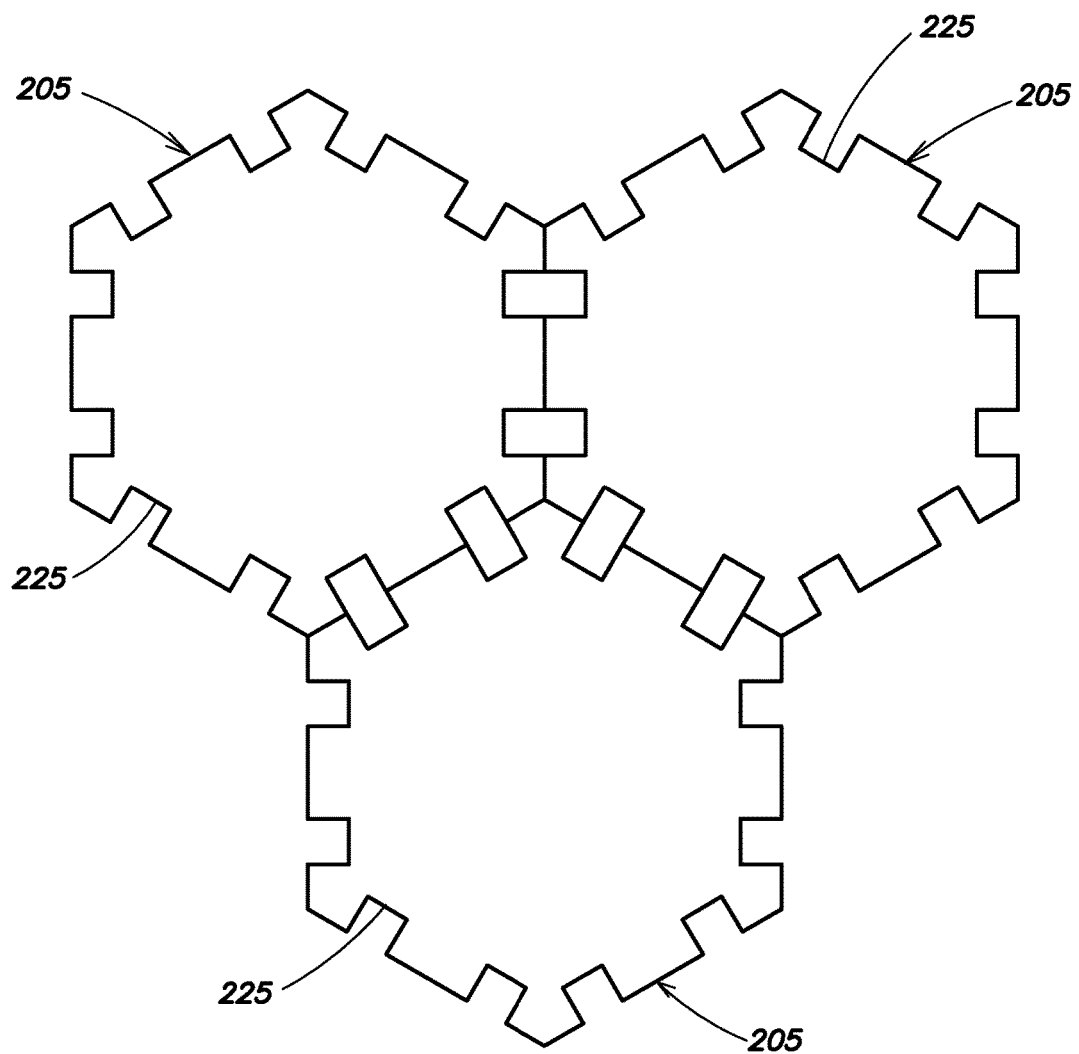
FIG. 8 is a schematic end view of a portion of a group of rods in another embodiment of a spar for a wind turbine blade.

An embodiment including channels 225 formed in rods 205 is illustrated in FIG. 8. The channels 225 may extend substantially or completely along a lengthwise extent of the rods 205. In some embodiments, the channels 225 are included in only a subset of rods 205 in a bundle of rods, in only a subset of sides of the rods 205, and/or only along a portion of the lengthwise extent of the rods 205. A channel 225 formed in one rod 205 may align with a channel 205 formed in an adjacent rod when the rods 205 are formed into a bundle, but this is not required. FIG. 8 shows a pair of channels 225 formed on each side of rods 205, but in other embodiments a fewer or greater number of channels 225 are formed on at least one rod 205 in the bundle of rods 205.

Figure 9:
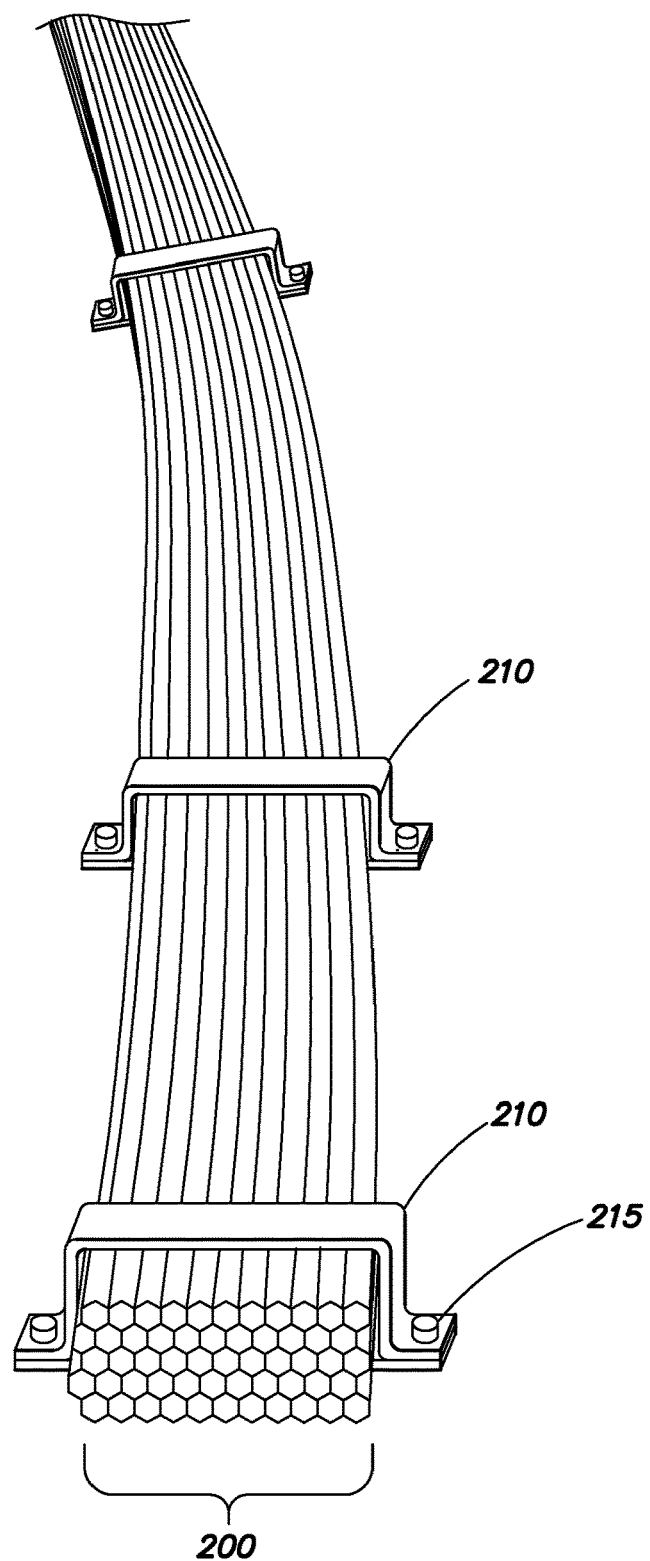
FIG. 9 illustrates another embodiment of a bundle of rods used to form a spar for a wind turbine blade.

As illustrated in FIG. 9, a spar 200 formed of hexagonal rods may be curved in a manner similar to the spar 100 illustrated in FIG. 2 and FIG. 5 to conform to an internal surface of a wind turbine blade. A spar 200 formed of hexagonal rods may also twist along a length thereof in a manner similar to the spar 100 illustrated in FIG. 2 and FIG. 5 to conform to an internal surface of a wind turbine blade along a spanwise length of a wind turbine blade. A spar 200 formed of hexagonal rods 105 may include brackets 210 and connectors 215, which may be similar to the brackets 110 and connectors 115 illustrated in FIG. 2 and FIG. 5, to facilitate holding the rods 205 forming the spar 205 in place relative to one another during shaping of the bundle of rods. In other embodiment, however, the spar may be formed without the use of brackets 210 and connectors 215.

In some embodiments, after a spar 100, 200 formed of a plurality of rods 105, 205 is coupled to or placed on a surface of a wind turbine blade, the spar 100, 200 is sealed in place on the wind turbine blade. The spar 100, 200 may be adhered to and/or sealed in place on or in the surface of the wind turbine blade with an adhesive or encapsulant. The adhesive or encapsulant may include any suitable thermoset and/or thermoplastic resin matrix, for example, an epoxy. The adhesive or encapsulant may adhere the plurality of rods 105, 205 in the bundle of rods forming the spar 100, 200 together and/or encapsulate the plurality of rods 105, 205 in the bundle of rods in addition to or as an alternative to adhering the rods 105, 205 in the bundle of rods to the wind turbine blade.

In some embodiments, a bundle of rods 105, 205 is shaped, placed in a mold, and an adhesive and/or encapsulant is introduced into the mold along with the bundle of rods to form a pre-fabricated spar which is subsequently attached to a surface of a wind turbine blade. In other embodiments, a bundle of rods 105, 205 is placed into a shaped mold held in place against a surface of a wind turbine blade or into a cavity formed in a wind turbine blade and an adhesive and/or encapsulant is introduced to both bond the rods 105, 205 together and bond the bundle of rods 105, 205 to the surface of the wind turbine blade in a single step.

It should be appreciated that wind turbine blade spars 100, 200 as disclosed to herein are not limited to being formed of rods 105, 205 having circular or hexagonal cross-sections. In alternate embodiments, a wind turbine blade spar may be formed from rods having a triangular, oval, pentagonal, or other polygonal or non-polygonal cross-sectional shape. In further embodiments, a wind turbine blade spar may be formed from rods having tubular or rectangular tubular cross-sections, or channel-shaped cross-sections, for example, C-sections or U-sections. A single spar may be formed of rods having multiple different cross-sectional shapes. A single wind turbine blade may include a plurality of spars formed of bundles of rods as disclosed herein.

In another embodiment of the present disclosure, there is provided a method of forming a wind turbine blade and/or of forming a spar for a wind turbine blade. An embodiment of the method is illustrated in the flowchart 300 of FIG. 10. In a first act of the method (act 310) rods for use in forming a spar of a wind turbine blade are formed. The rods are formed from a composite material including, for example, fiberglass, carbon fibers, boron fibers, metallic fibers, and/or other fibers in a matrix of a suitable thermoset and/or thermoplastic resin matrix, for example, an epoxy matrix. The fibers of the rods are oriented parallel or generally parallel to a lengthwise direction of the rods. The rods may be formed by, for example, extrusion, pultrusion, infusion, pre-preg, press molding, or other methods known in the art for the production of composite material structures. A pultrusion process may be utilized to provide for the fibers of the rods to be oriented more consistently with one another and more parallel to the lengthwise extent of the rods than other manufacturing processes. The rods may have a circular or substantially circular cross-section, a hexagonal or substantially hexagonal cross-section, or a cross-section of any other desired geometric shape. The rods may have a substantially hexagonal or hexagonal cross-section and include carbon fibers embedded in an epoxy or other polymeric matrix and may be formed by a pultrusion process. The rods may include one or more features which provide spaces between adjacent rods for the introduction of an adhesive between the adjacent rods. For example, one or more sides of the rods may be formed with one or more of ridges, protrusions, grooves, channels, valleys, or other features configured to provide spacings between adjacent rods. The rods may be formed with tapered end portions as illustrated in FIG. 3.

In act 320 the rods formed in act 310 are bundled together to form a bundle of rods. The bundle of rods may include a plurality of rods arranged horizontally side by side and a plurality of rods stacked on one another vertically. The bundle of rods may be held together using one or more brackets, connectors, tie-wraps, or other retaining mechanisms known in the art. The bundle of rods may include rods of multiple different cross-sectional shapes and/or lengths and/or materials.

In act 330, the bundle of rods is formed into a desired shape. The bundle of rods may be, for example, bent, curved, twisted, or otherwise formed into a shape suitable for mounting in a wind turbine blade. As the bundle of rods is formed into a desired shape, adjacent rods may slide against one another along their lengthwise directions and/or may rotate relative to one another. The bundle of rods may be shaped to conform to an internal surface of a wind turbine blade. The bundle of rods may be shaped to conform to an internal surface of an outer shell of a wind turbine blade.

In act 340, the bundle of rods is mounted to a wind turbine blade. The bundle of rods may be mounted to an internal surface of a wind turbine blade, for example, an internal surface of an outer shell of a wind turbine blade. The bundle of rods may be affixed to the wind turbine blade using any suitable bracket, connector, or adhesive. The bundle of rods may be mounted to the wind turbine blade in a manner such that the bundle of rods substantially conforms to a surface, for example, an internal surface of the wind turbine blade.

In act 350, the rods in the bundle of rods are adhered to one another and/or to the internal surface of the wind turbine blade. The bundle of rods may additionally or alternatively be encapsulated in an encapsulant. An adhesive or encapsulant utilized in act 350 may include any suitable thermoset and/or thermoplastic resin matrix, for example, an epoxy. In some embodiments, the bundle of rods is placed in a shaped mold held against a surface of a wind turbine blade or a compartment formed in the wind turbine blade along with an adhesive and/or encapsulant to adhere the bundle of rods to one another and/or to the surface of the wind turbine blade.

Figure 10:
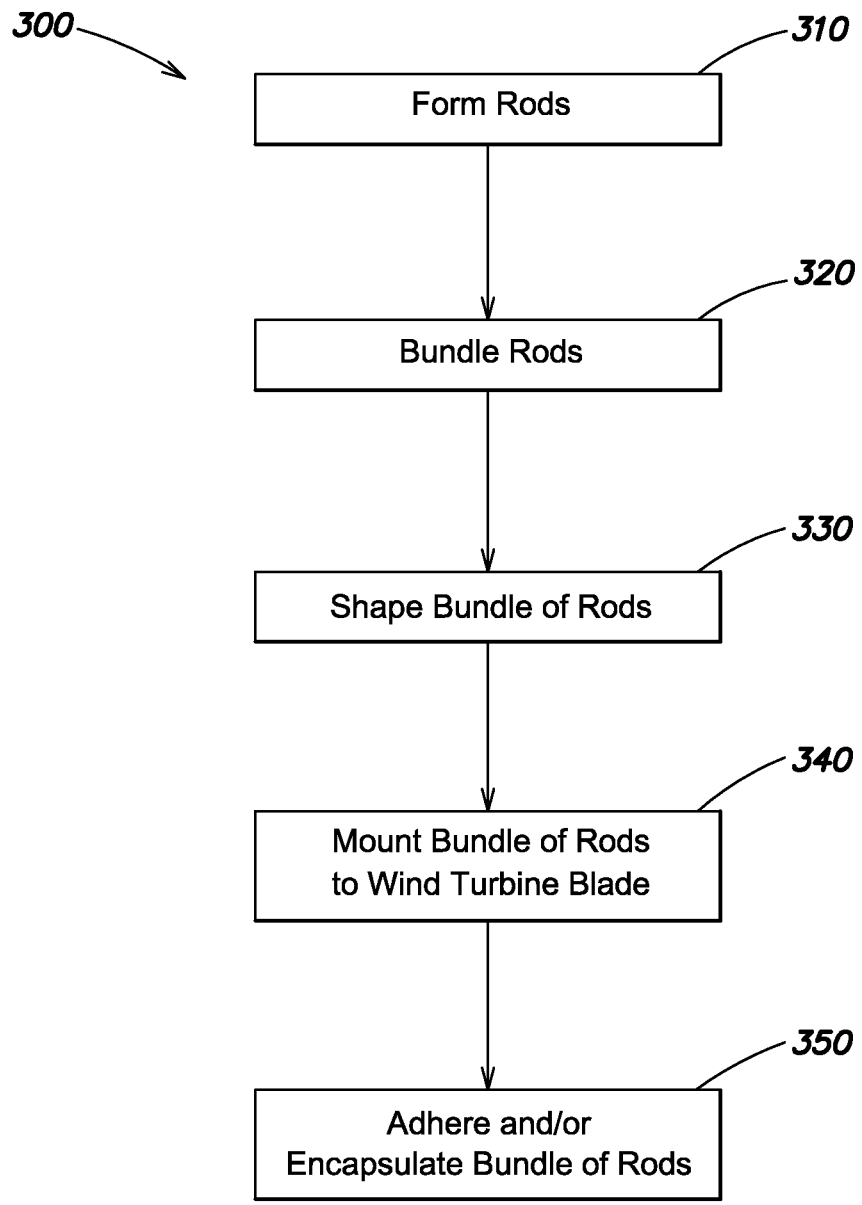
FIG. 10 is a flow chart of an embodiment of a method of forming a wind turbine blade.

It will be appreciated that the various acts of the method illustrated in FIG. 10 may be combined or performed in a different order than illustrated. For example, the act of bundling the rods (act 320) and/or shaping the bundle of rods (act 330) and/or mounting the bundle of rods to the wind turbine blade (act 340) may be performed concurrently. Further, one or more of the illustrated acts may be omitted or substituted with one or more alternative or additional acts.

Figure 11:
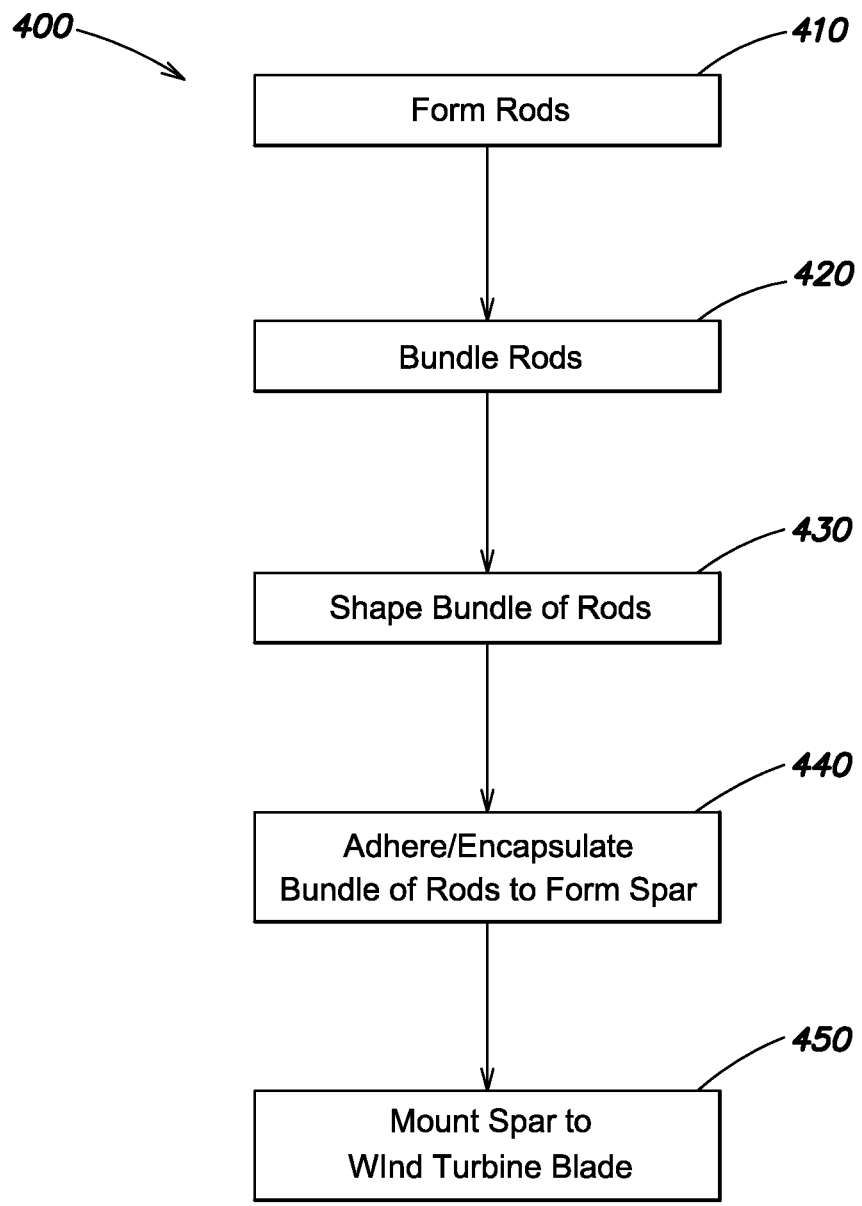
FIG. 11 is a flow chart of another embodiment of a method of forming a wind turbine blade.

For example, in another embodiment of forming a wind turbine blade and/or of forming a spar for a wind turbine blade, illustrated in the flowchart 400 of FIG. 11, a bundle of rods is prefabricated into a spar (act 440) prior to joining the spar to the wind turbine blade (act 450). The spar may be prefabricated by placing the bundle of rods into a shaped mold, introducing an adhesive and/or encapsulant into the shaped mold with the bundle of rods, allowing the adhesive and/or encapsulant to cure, and then removing the formed spar from the shaped mold. Acts 410, 420, and 430 of flowchart 400 may be substantially similar to acts 310, 320, and 330 of flowchart 300, respectively. In some embodiments, the bundle of rods may be shaped (act 430) prior to being placed into a mold, and in other embodiments, the act of placing the bundle of rods in the mold causes the bundle of rods to assume a desired shape.

Although described with reference to wind turbine blades, it will be appreciated that spars as disclosed herein may be utilized in other structures. For example, spars as disclosed herein may be utilized as strengthening elements in aircraft propellers, aircraft wings, or other structures having elongated blades.

Any references to embodiments or elements or acts of the systems and methods herein referred to in the singular may also embrace embodiments including a plurality of these elements. Features of any embodiment disclosed herein may be utilized with or combined with any features of any other embodiment disclosed herein. References to "or" should be construed as inclusive so that any terms described using "or" may indicate any of a single, more than one, and all of the described terms.

It will be appreciated that further embodiments and exemplifications of the invention are possible without departing from the spirit or scope of the invention described.

What is claimed is:

1. A spar for use in a blade of a wind turbine, the spar comprising:
   a plurality of rods formed of a composite material including a matrix material and fibers embedded in the matrix material, the fibers oriented parallel to a lengthwise direction of the plurality of rods, the plurality of rods having polygonal cross-sections, the plurality of rods being bundled together into a bundle having a first plurality of rods disposed along a widthwise extent of the bundle and a second plurality of rods disposed along a heightwise extent of the bundle, the plurality of rods including side surfaces having channels formed in the side surfaces, the channels extending along the lengthwise direction and substantially along a lengthwise extent of each of the plurality of rods; and means to secure rods within the plurality of rods to one another.

2. The spar of claim 1, wherein the plurality of rods is embedded in a second matrix material.

3. The spar of claim 2, wherein the second matrix material is a polymeric matrix material.

4. The spar of claim 2, wherein the plurality of rods includes a rod with a hexagonal cross-section.

5. The spar of claim 4, wherein a majority of the plurality of rods in the bundle of rods have hexagonal cross-sections.

6. The spar of claim 4, wherein the plurality of rods includes rods formed of a pultruded composite including carbon fibers.

7. The spar of claim 4, wherein the bundle of rods includes rods having different lengths.

8. The spar of claim 7, wherein at least a portion of the plurality of rods include tapered end portions.

9. The spar of claim 8, wherein the tapered end portions are located on ends of the portion of the plurality of rods distal from a portion of the bundle configured to be mounted proximate a base of the blade of the wind turbine and proximal to a portion of the bundle configured to be mounted proximate a tip of the blade of the wind turbine.

10. The spar of claim 1, wherein the bundle of rods twists and curves along a lengthwise extent of the bundle into a shape configured to conform to an internal surface of the blade of the wind turbine.

11. The spar of claim 10, wherein the bundle of rods twists and curves along a lengthwise extent of the bundle into a shape configured to conform to an internal surface of an outer shell of the blade of the wind turbine.

12. The spar of claim 1, wherein spacings are formed between adjacent rods in the bundle.

13. The spar of claim 12, wherein at least a portion of the plurality of rods include side surfaces having protrusions formed on the side surfaces.

14. The spar of claim 12, wherein one of a matrix material, a binding material, and an encapsulent is disposed within at least a portion of the spacings.

15. The spar of claim 1, wherein the bundle of rods is sized and shaped to extend substantially along a span of the wind turbine blade.

16. A wind turbine having a blade comprising:
a blade shell having an inner surface; and
a spar secured to the inner surface of the blade shell, the spar including a plurality of rods having hexagonal cross-sections bonded together, the plurality of rods including side surfaces having channels formed in the side surfaces, the channels extending along a lengthwise direction and substantially along a lengthwise extent of each of the plurality of rods.

17. The wind turbine blade of claim 16, wherein the plurality of rods comprise a pultruded composite including carbon fibers embedded in a matrix material and extending parallel to a lengthwise extent of the spar.

18. The wind turbine blade of claim 16, wherein at least a portion of the plurality of rods include tapered end portions proximate a tip of the wind turbine blade.

19. The wind turbine blade of claim 16, wherein at least a portion of the plurality of rods are spaced from one another by protrusions formed in side surfaces of the at least a portion of the plurality of rods.

20. The wind turbine blade of claim 16, wherein the spar has a shape that changes along a spanwise direction of the wind turbine blade.

21. The wind turbine blade of claim 20, wherein the spar conforms to an internal surface of the turbine blade.

22. A method of forming a wind turbine blade, the method comprising:
bundling a plurality of rods to form a bundle of rods, the bundle having a first plurality of rods disposed along a widthwise extent of the bundle and a second plurality of rods disposed along a heightwise extent of the bundle, the plurality of rods including side surfaces having channels formed in the side surfaces, the channels extending along a lengthwise direction and substantially along a lengthwise extent of each of the plurality of rods;
shaping the bundle of rods into a shape configured to conform to an internal surface of a shell of the wind turbine blade;
mounting the bundle of rods to an internal surface of the shell of the wind turbine blade; and
encapsulating or bonding the bundle of rods.

* * * * *